United States Patent
Rodriguez et al.

(10) Patent No.: US 8,011,461 B2
(45) Date of Patent: Sep. 6, 2011

(54) HYBRID ELECTRIC CONVERSION KIT FOR REAR-WHEEL DRIVE, ALL WHEEL DRIVE, AND FOUR WHEEL DRIVE VEHICLES

(75) Inventors: Fernando Rodriguez, Hammond, IN (US); Srdjan M. Lukic, Chicago, IL (US); Sanjaka G. Wirasingha, Forest Park, IL (US); Ali Emadi, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 571 days.

(21) Appl. No.: 12/031,172

(22) Filed: Feb. 14, 2008

(65) Prior Publication Data

US 2009/0223725 A1 Sep. 10, 2009

(51) Int. Cl.
*B60K 6/20* (2007.10)
(52) U.S. Cl. .............. 180/65.23; 180/65.21; 180/65.1; 180/65.25; 180/65.31; 477/3
(58) Field of Classification Search ........ 180/65.1–65.8, 180/65.21, 65.225, 65.235, 65.25–65.26, 180/65.31; 477/3, 5
See application file for complete search history.

(56) References Cited

U.S. PATENT DOCUMENTS

| | | | |
|---|---|---|---|
| 3,904,883 A | | 9/1975 | Horwinski |
| 4,042,056 A * | | 8/1977 | Horwinski ............... 180/65.25 |
| 4,090,577 A | | 5/1978 | Moore |
| 4,269,280 A | | 5/1981 | Rosen |
| 5,562,178 A * | | 10/1996 | Worden et al. .............. 180/291 |
| 6,116,363 A * | | 9/2000 | Frank ...................... 180/65.25 |
| 6,164,400 A * | | 12/2000 | Jankovic et al. ........... 180/65.25 |
| 6,332,257 B1 * | | 12/2001 | Reed et al. ................ 29/401.1 |
| 6,367,570 B1 * | | 4/2002 | Long et al. ............... 180/65.26 |
| 6,435,293 B1 * | | 8/2002 | Williams ................... 180/65.1 |
| 6,484,830 B1 | | 11/2002 | Gruenwald et al. |
| 6,648,086 B1 | | 11/2003 | Schulte |
| 6,973,880 B2 | | 12/2005 | Kumar |
| 6,978,854 B1 | | 12/2005 | Kuang et al. |
| 7,004,273 B1 | | 2/2006 | Gruenwald et al. |
| 7,137,344 B2 | | 11/2006 | Kumar et al. |
| 7,185,591 B2 | | 3/2007 | Kumar et al. |
| 7,681,676 B2 * | | 3/2010 | Kydd ........................ 180/65.21 |
| 2002/0144848 A1 | | 10/2002 | Schulte |
| 2004/0188154 A1 | | 9/2004 | Carlson |
| 2005/0005814 A1 | | 1/2005 | Kumar et al. |
| 2005/0120715 A1 | | 6/2005 | Labrador |
| 2005/0205313 A1 * | | 9/2005 | Gilmore et al. ............. 180/65.2 |
| 2005/0211480 A1 * | | 9/2005 | Kejha ....................... 180/65.2 |
| 2006/0000650 A1 * | | 1/2006 | Hughey ..................... 180/65.2 |
| 2006/0030450 A1 * | | 2/2006 | Kyle ............................ 477/3 |

* cited by examiner

*Primary Examiner* — J. Allen Shriver, II
*Assistant Examiner* — James Triggs
(74) *Attorney, Agent, or Firm* — Pauley Petersen & Erickson

(57) ABSTRACT

This invention relates to a parallel hybrid electric conversion kit for a vehicle with an internal combustion engine, a driveshaft and a transmission, such as, rear wheel drive vehicles, four-wheel drive vehicles, heavy duty multiple-driven-axle vehicles and/or all-wheel drive vehicles. The conversion kit includes a motor-generator, a torque coupler, a battery, a power electronics module and a controller. Suitable torque couplers include transfer cases and/or rear-through differentials. The conversion kit provides an aftermarket solution to increased performance, fuel economy and/or reduced emissions by modifying the drivetrain after the transmission. According to one embodiment of this invention, the control scheme of the installed conversion kit receives input signals from the engine and the motor-generator, but only sends control signals to the motor-generator, facilitating installation of the conversion kit.

20 Claims, 8 Drawing Sheets

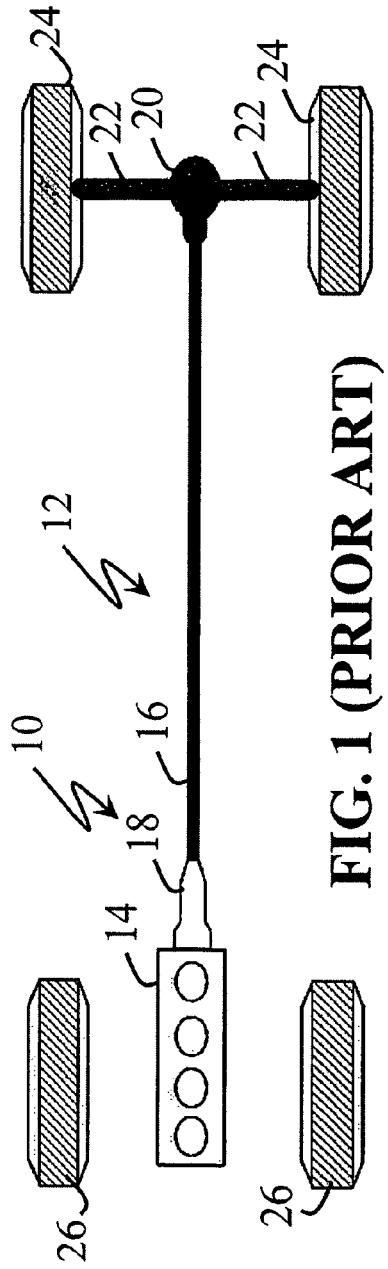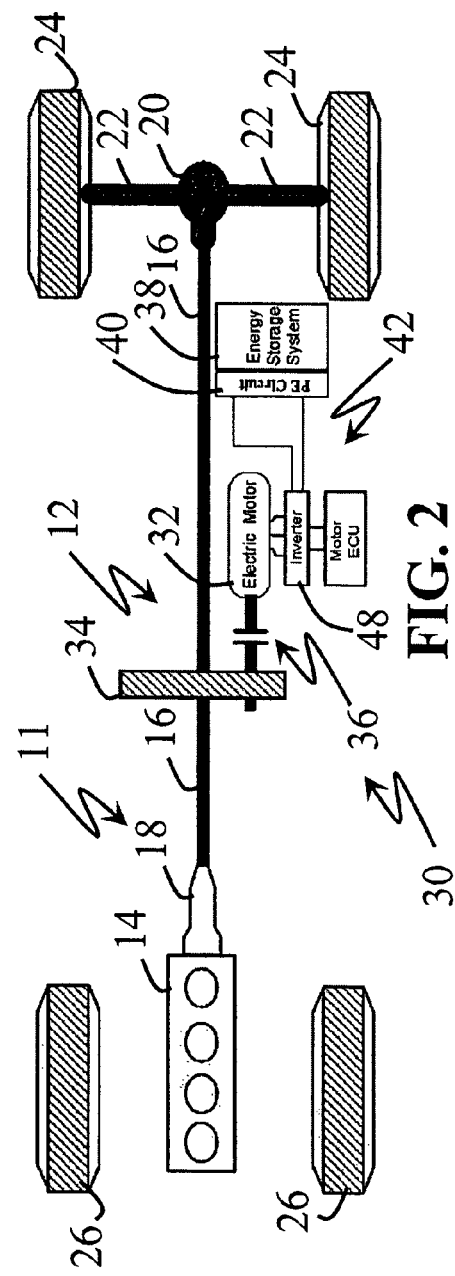

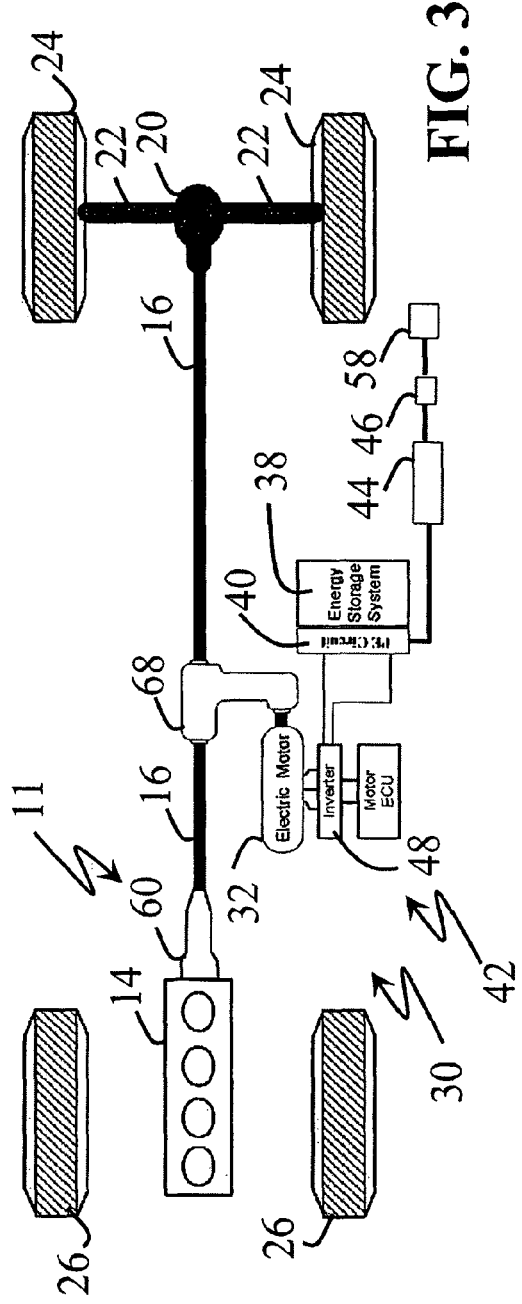
FIG. 3
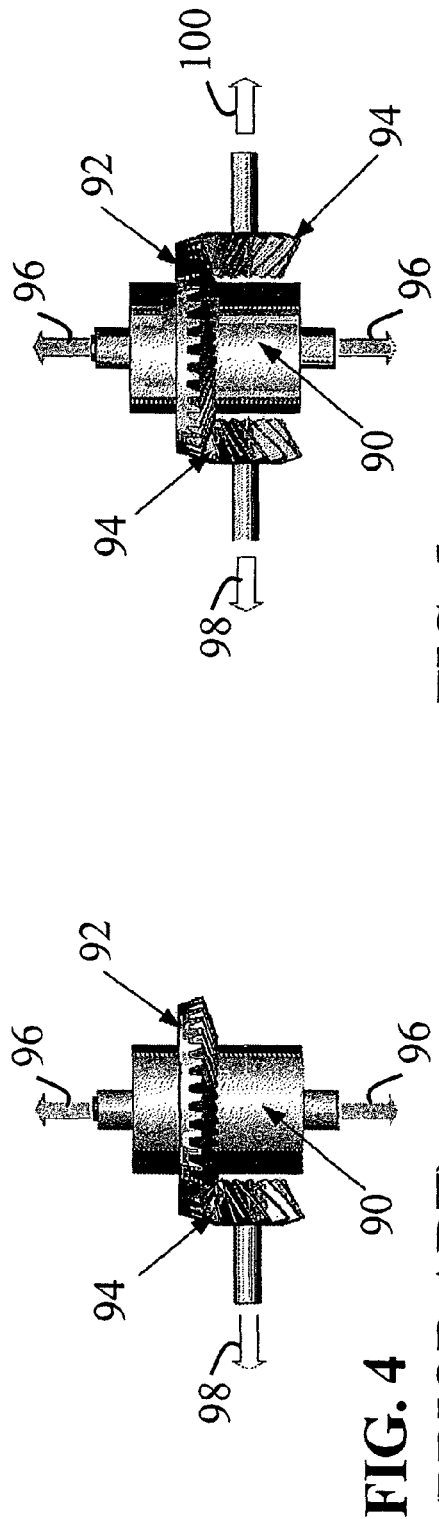
FIG. 5
FIG. 4 (PRIOR ART)

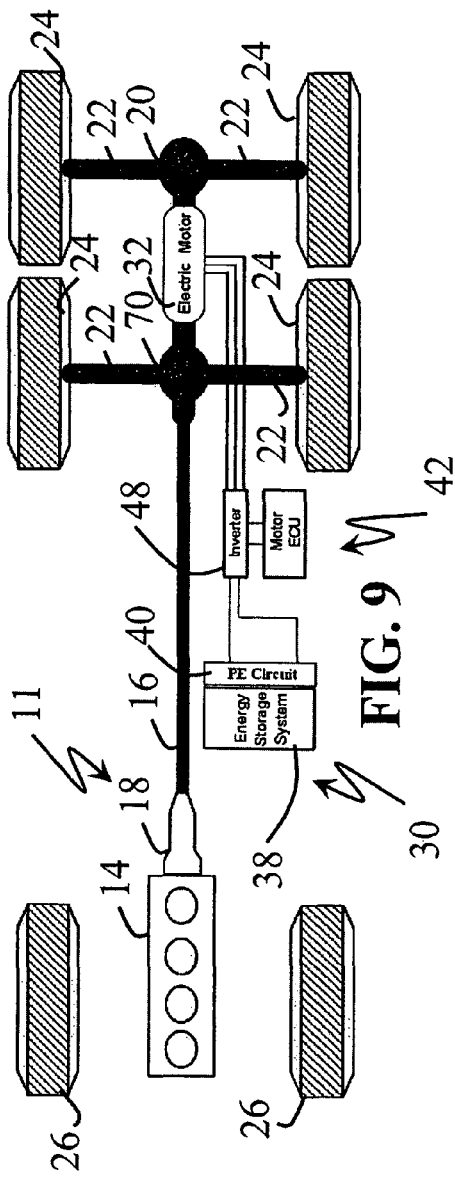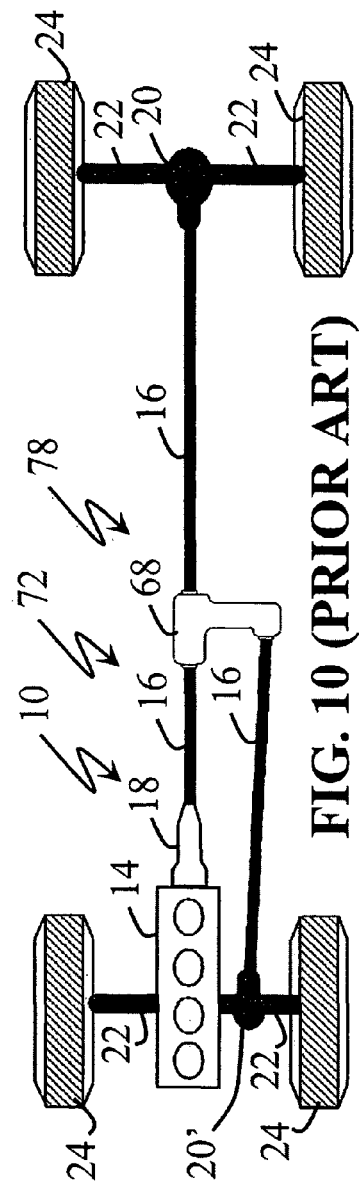

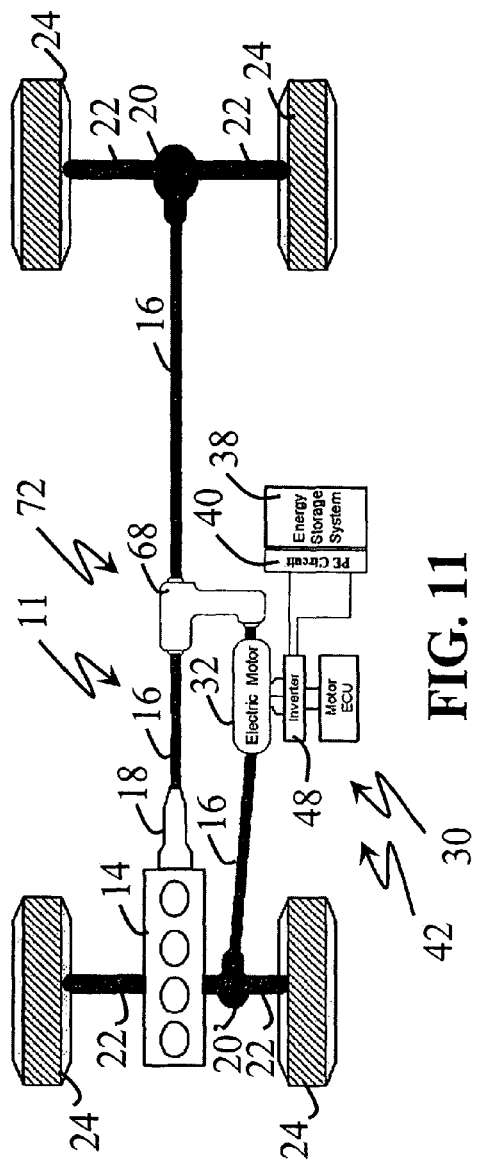
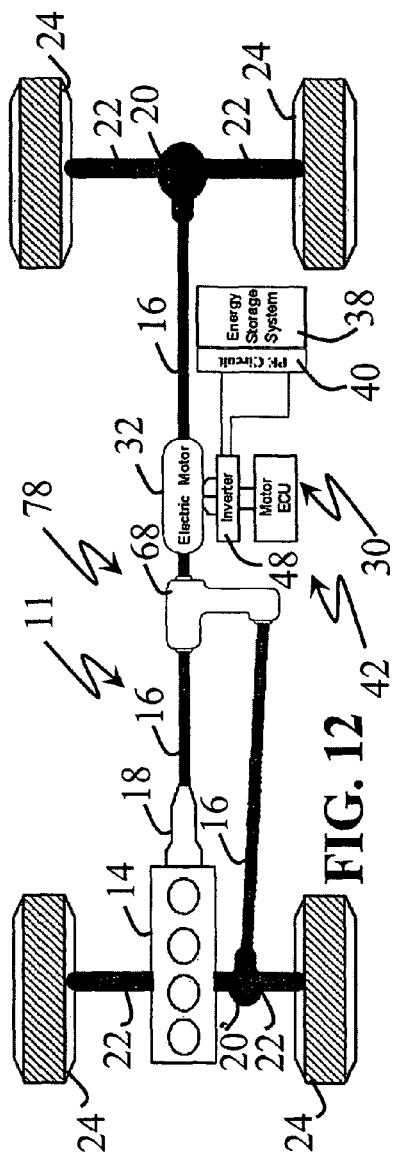
FIG. 11
FIG. 12

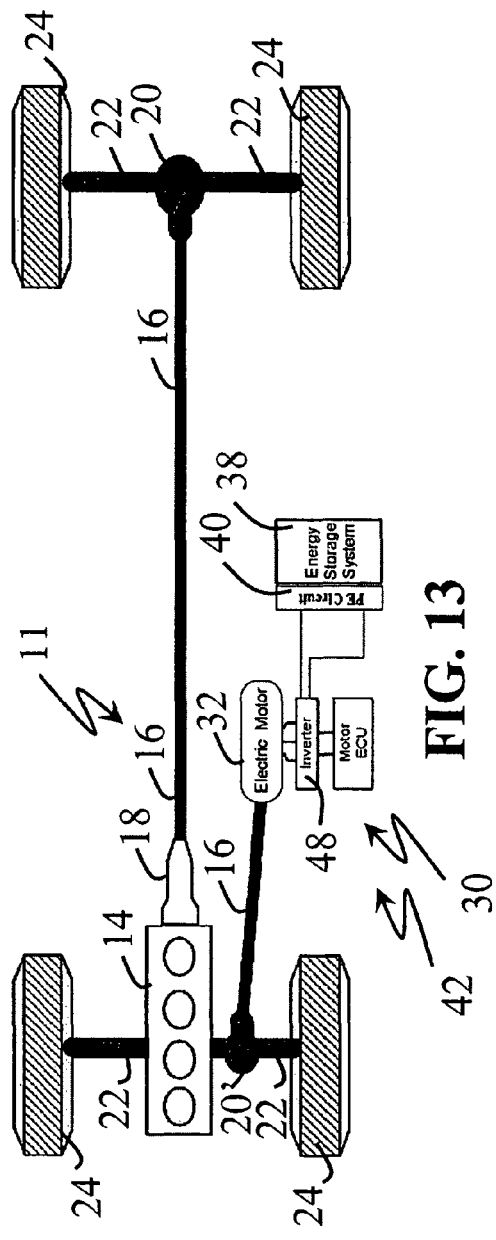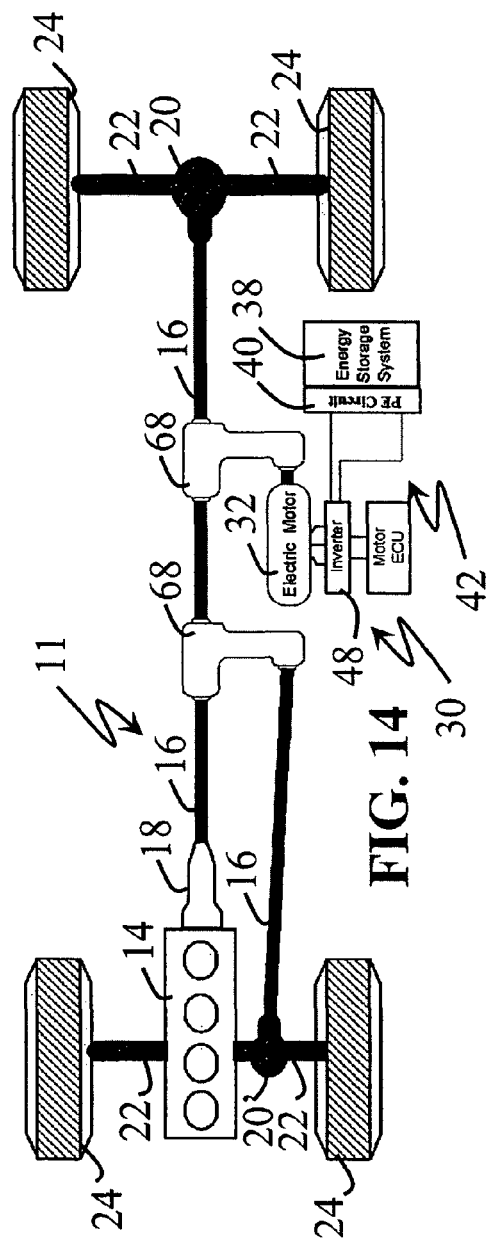
FIG. 13
FIG. 14

HYBRID ELECTRIC CONVERSION KIT FOR REAR-WHEEL DRIVE, ALL WHEEL DRIVE, AND FOUR WHEEL DRIVE VEHICLES

BACKGROUND OF THE INVENTION

1. Field of the Invention

The present invention includes a hybrid electric vehicle conversion kit for a conventional internal combustion engine vehicle.

2. Discussion of the Related Art

There is a general desire to improve performance, increase fuel economy or gas mileage, and/or reduce tailpipe emissions from conventional internal combustion engine vehicles. In response to these desires, hybrid electric vehicles ("HEVs") have been developed that incorporate an electric drive system typically in combination with a smaller internal combustion engine and a generator. Known HEVs offer some advantages, but still require the person to purchase a separate and/or a new vehicle.

There is a need for a simple conversion kit to provide the benefits of a HEV to a conventional internal combustion engine vehicle.

SUMMARY OF THE INVENTION

A general object of the invention is to provide an aftermarket parallel hybrid electric vehicle conversion kit to increase performance, improve fuel economy and/or reduce emissions.

A more specific objective of the invention is to overcome one or more of the problems described above.

The general object of the invention can be attained, at least in part, through a vehicle retrofit kit for a vehicle with an internal combustion engine connected to a driveshaft by a transmission, such as rear wheel drive vehicles, four-wheel drive vehicles, heavy duty multiple-driven-axle vehicles and all-wheel drive vehicles, for example.

According to one embodiment of this invention, the retrofit kit includes a motor-generator, a torque coupler, a battery, a power electronics module and a controller. The torque coupler may connect the motor-generator to the driveshaft with or without a clutch, such as, for example, by a transfer case and/or a rear-through differential. The battery stores electrical potential and/or power. Desirably, the power electronics module includes a first electrical connector joined with respect to the battery and a second electrical connector joined with respect to the motor-generator. Optionally, the power electronics module includes an inverter.

The controller includes a first communication connection for receiving signals from the internal combustion engine and a second communication connection for receiving and/or sending signals with respect to the motor-generator. The controller may further include a decision circuit to activate the motor-generator for transferring electrical energy between the battery and/or mechanical energy from the driveshaft. Advantageously, the controller exclusively sends signals to the motor-generator, in other words the controller does not send signals to the internal combustion engine, such as, facilitating and/or simplifying installation of the conversion kit in and/or on the vehicle. Suitable operating modes of the installed conversion kit include generating mode, motoring mode, braking mode and/or electric only mode.

According to another embodiment of this invention, a parallel hybrid electric vehicle includes: an internal combustion engine supplying mechanical energy; a driveshaft; a transmission connecting the internal combustion engine to the driveshaft; a torque coupler connected to the driveshaft on a side of the transmission opposite the internal combustion engine; a motor-generator mechanically connected to the torque coupler and for converting one of mechanical energy and electrical energy to one of mechanical energy and electrical energy; a battery electrically connected to the motor-generator; and a controller in communication with the internal combustion engine and the motor-generator.

The invention further includes a method to hybridize a conventional vehicle including the steps of: providing a vehicle with an internal combustion engine, a transmission and a driveshaft; connecting a torque coupler to the driveshaft downstream from the transmission; connecting a motor-generator to the torque coupler; connecting a battery to the motor-generator using a power electronics module; connecting an input signal from the internal combustion engine and the motor-generator to a controller; and connecting an output signal from the controller to the motor-generator.

BRIEF DESCRIPTION OF THE DRAWINGS

These and other objects and features of this invention will be better understood from the following detailed description taken in conjunction with the drawings, wherein:

FIG. 1 shows a conventional rear-wheel drive vehicle;

FIG. 2 shows a rear wheel drive vehicle with a HEV conversion kit installed, according to one embodiment of this invention;

FIG. 3 shows a rear wheel drive vehicle with a HEV conversion kit installed (transfer case implementation), according to one embodiment of this invention;

FIG. 4 shows a conventional vehicle differential (single input), top view;

FIG. 5 shows a modified vehicle differential (dual input), top view, according to one embodiment of this invention;

FIG. 9 shows a heavy duty rear wheel drive vehicle having a rear through-differential with a HEV conversion kit installed, according to one embodiment of this invention;

FIG. 10 shows a conventional four-wheel drive vehicle;

FIG. 11 shows a four-wheel drive vehicle with a HEV conversion kit installed, according to one embodiment of this invention;

FIG. 12 shows an all-wheel drive vehicle with a HEV conversion kit installed, according to one embodiment of this invention;

FIG. 13 shows an all-wheel drive vehicle with a HEV conversion kit installed (parallel through the road), according to one embodiment of this invention;

FIG. 14 shows an all-wheel drive vehicle with a HEV conversion kit installed (dual transfer case configuration), according to one embodiment of this invention;

DETAILED DESCRIPTION

Figure 7:
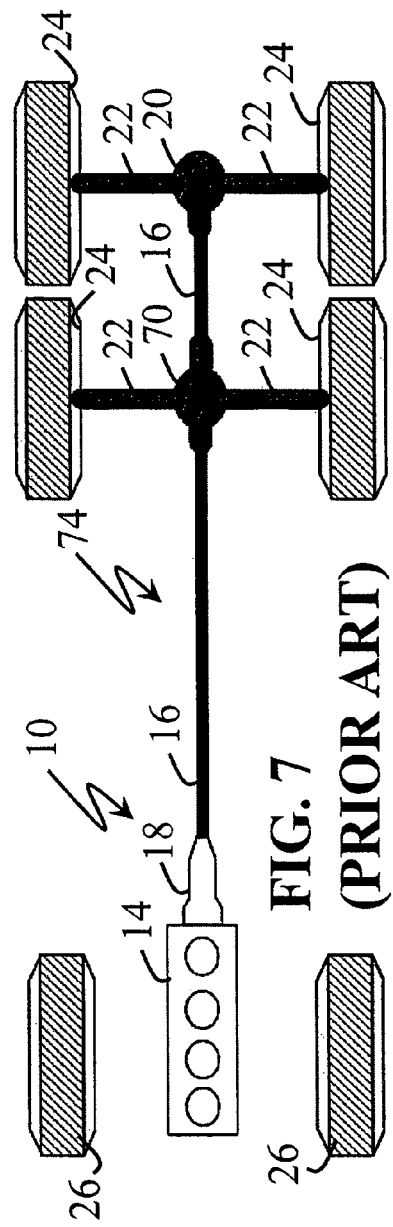
FIG. 7 shows a heavy duty rear wheel drive vehicle with a rear through-differential.

According to an embodiment, this invention includes a conversion kit to convert and/or transform a conventional vehicle into a hybrid electric vehicle. As shown in FIG. 2, Hybrid Electric Vehicles ("HEV") 11 couple the power provided by an internal combustion engine ("ICE") 14 with the power provided by an electric motor-generator 32 to propel the HEV 11 with better performance and/or higher efficiency than existing and/or conventional vehicles. Conventional vehicles 10 include rear wheel drive, heavy duty multiple-driven axles, all-wheel drive and/or four-wheel drive, for example, and as shown in FIGS. 1, 7 and 10.

As shown in FIG. 2, the invention desirably includes an add-on HEV conversion kit 30 for installation in a conventional vehicle. Conventional vehicles 10 may include rear-wheel drive vehicles 12, as shown in FIG. 1, heavy duty multiple-driven axle vehicles 74, as shown in FIG. 7, all-wheel drive vehicles 78, as shown in FIG. 10, four-wheel drive vehicles 72 vehicles, as shown in 10, and/or any other suitable combination of wheels and drivetrain components providing the desired traction capabilities. Those skilled in the art and guided by the teachings herein readily appreciate that there are significant structural similarities between all-wheel drive vehicles 78 and four-wheel drive vehicles 72 vehicles with changes occurring primarily in the control mechanisms, for example.

The retro-fit technique of this invention for a HEV 11 may be used with any conventional vehicle 10 including, but not limited to, passenger cars, trucks, buses, semi-trucks and/or any other suitable vehicle for transporting persons and/or goods. The retro-fit technique of this invention for a HEV 11 may be used in any application including, but not limited to, personal, passenger, family, pubic transportation, mass transit, business, commercial, fleet industrial, agricultural, military, rural, urban, suburban, wilderness, off-road, paved and/or any other suitable location and/or setting. Vehicles driven heavily under frequent stop and go conditions may benefit from hybridization to reduce emissions and/or improve fuel economy.

Those skilled in the art and guided by the teachings herein readily appreciate that the ICE 14, as shown in FIGS. 1-3, 6, 7 and 9-16, is not limited to piston engines but broadly includes, without limitation, positive displacement engines, inline engines, V-shaped engines, radial engines, rotary engines, combustion turbines, fuel cells and/or any other suitable motive device. Typical fuels for the ICE 14 include, without limitation, hydrogen, natural gas, steam, gasoline, diesel, fuel oil, wood, coal, and/or any other suitable energy containing substance.

Figure 6:
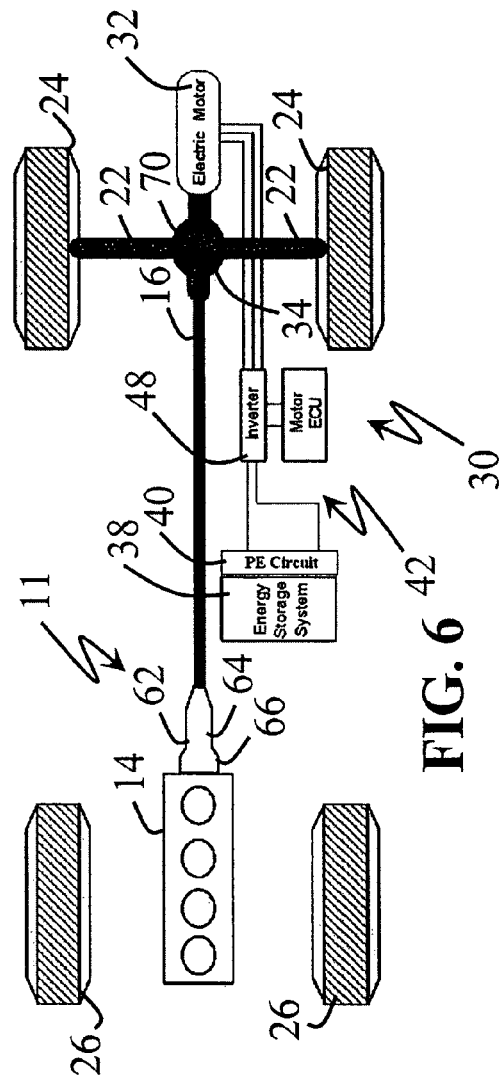
FIG. 6 shows a rear wheel drive vehicle with a HEV conversion kit installed (dual input differential implementation), according to one embodiment of this invention.
Figure 16:
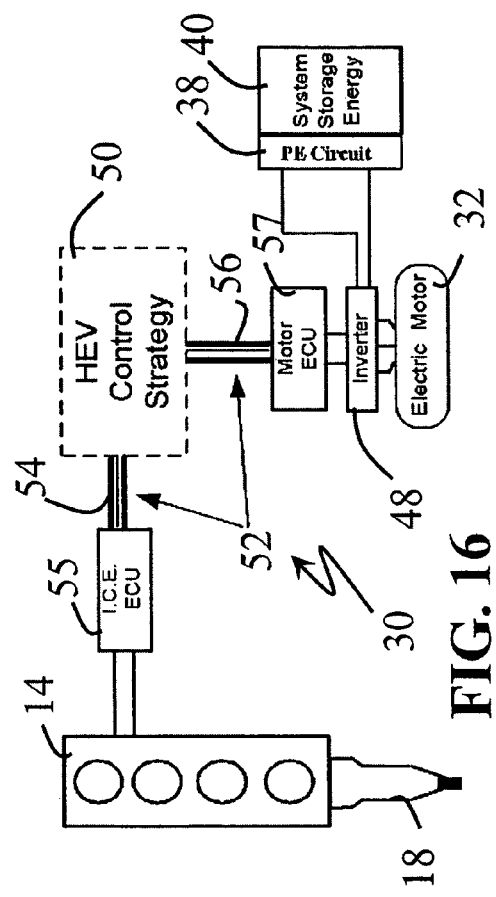
FIG. 16 shows a HEV system control diagram, according to one embodiment of this invention.

According to an embodiment of this invention, the HEV conversion kit 30 includes: 1) a mechanical configuration having the electric drivetrain after the vehicle transmission 18, as shown in FIG. 2; 2) a clutch pedal measurement and/or sensing for manual transmission vehicles, as shown in FIG. 6; 3) a control strategy algorithm 50 without modifying the original vehicle controls and/or engine controls, as shown in FIG. 16; and/or 4) a retrofit kit 30 allowing the use of existing conventional vehicles 10, as shown in FIGS. 1 and 2.

Hybrid architectures may include the series hybrid and the parallel hybrid. In the series hybrid, the electric motor delivers traction power while the ICE in combination with a generator (not shown) produces electric power to drive the electric motor, for example. Application of the series hybrid architecture to an existing conventional vehicle may include the mechanical decoupling of the ICE and the transmission. The electric motor may attach to the transmission and/or directly to the rear differential, thus including physical relocation of either the ICE and/or the transmission. This significant reconfiguration of the drivetrain is possible, but may include additional cost and/or complexity.

On the other hand, the parallel hybrid configuration may be more attractive from an electrical and/or mechanical point of view for a retrofit hybridization. According to embodiments of this invention, there are several methods and/or manners of implementing parallel hybridization on an existing vehicle. The vehicle configurations that may be readily retrofitted include rear wheel drive vehicles 12, as shown in FIG. 1, all-wheel drive vehicles 78, as shown in FIG. 7, four-wheel drive vehicles 72, as shown in FIG. 7, and/or any other suitable arrangement of components. Hybridization of front wheel drive vehicles with a retrofit kit is possible. Known rear wheel drive vehicles 12 have the ICE 14 located in the front of the vehicle with a driveshaft 16 extending to the rear differential 20 for distributing power to the driven wheels 24 through axles 22, as shown in FIG. 1, for example. Non-driven wheels 26 may provide stability and/or steering control, for example.

FIG. 2 shows a conventional rear wheel drive vehicle 12 after installation and/or hybridization with the HEV kit 30, according to an embodiment of this invention. Desirably, but not necessarily, the vehicle driveshaft 16 may be cut and/or replaced between the output of the transmission 18 and the input of the rear differential 20 for installation of a fixed gear ratio torque coupler 34 to allow the torque summation of the electric machine and/or motor-generator 32 used to hybridize the vehicle. Geared torque couplers 34 with differing shaft rotational speeds are possible. Torque couplers 34 may include any suitable gear box and/or combination of mechanical components, for example. Driveshafts 16 may include universal joints on and/or at one or more locations (ends and/or middle) to facilitate installation, for example.

Those skilled in the art and guided by the teachings herein readily appreciate that references to motor-generator 32, electric motor, electric machine and the like, refer to suitable devices for converting between at least one of electrical energy and/or mechanical energy. Desirably, the motor-generator 32 receives electrical power to provide mechanical power and receives mechanical power to provide electrical power, as shown in FIG. 2. Typically, but not necessarily, the motor-generator 32 includes a motor electronic control unit ("ECU") 57 controlling at least a portion of the electrical management functionality, as shown in FIG. 16. The motor-generator 32 may include more than one phase, such as, three phases.

Alternately and as shown in FIG. 2, an optional clutch 36 may be installed along with the hybridization kit 30 to add overall system flexibility, for example, to allow repair of the hybrid kit 30 once the converted vehicle 11 is in operation. The electric motor 32 may be disengaged with the clutch 36 and the vehicle 11 driven as a conventional vehicle until the hybrid system 30 is repaired. Clutch 36 broadly may include any suitable coupling and/or decupling device regarding a mechanical system, such as, a drivetrain, for example.

According to an embodiment of this invention, torque summation of the torque coupler may use a transfer case, for example. As shown in FIG. 3, the hybrid kit 30 may be installed with a transfer case 68 for the torque coupler. Desirably, transfer case 68 includes a robust and/or durable design. Transfer case 68 may typically include a clutch, not shown, similar in function to clutch 36 as shown in FIG. 2 integrated into the structure resulting in a compact package for the hybrid conversion kit 30 versus a separate torque coupler and a clutch.

According to another embodiment of this invention, torque summation modifies and/or replaces the vehicle differential. Conventional differentials, as shown in FIG. 4 may be modified with the addition of a second pinion 94 and second pinion shaft assembly to create a second input to the differential, as shown in FIG. 5, for example. The second input may be coupled to the shaft of an electric machine for a vehicle that receives propulsion power from the ICE and electric machine through the modified differential, as shown in FIG. 6, for example. Suitable modified differentials may include a rear through-differential 70.

Figure 8:
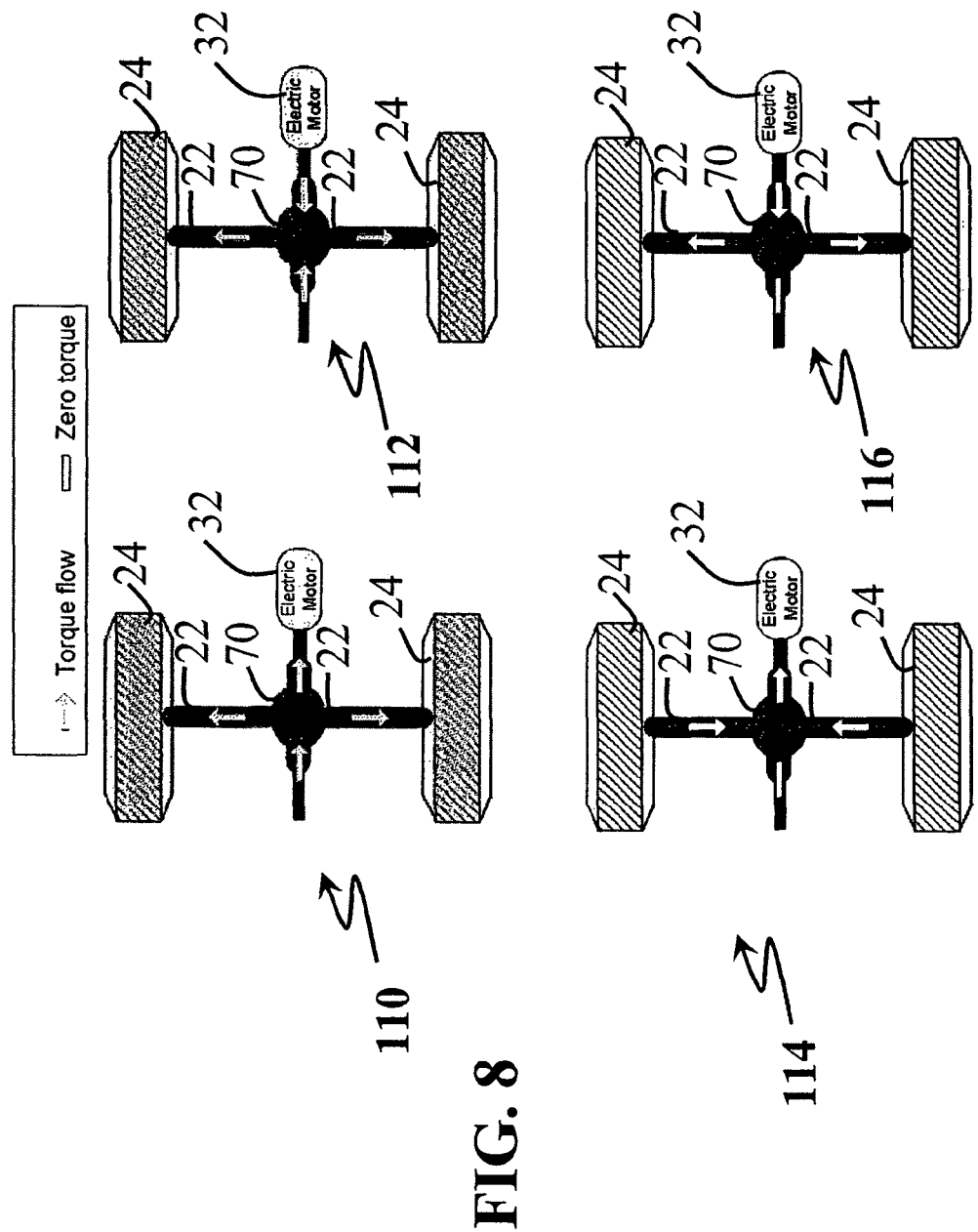
FIG. 8 shows modes of operation with a dual input differential, according to one embodiment of this invention.

According to an embodiment of this invention, the hybridization of any rear wheel vehicle, as shown in FIG. 1, by converting a single input differential 20 into a dual input differential 70, as shown in FIG. 6, is possible, for example by removing an end cover plate from the differential 20, sometimes referred to as a pumpkin cover, and mating a new assembly to the bevel ring gear 92 and the housing 90, as shown in FIG. 5. Desirably, a distinction between existing through differentials and a modified (dual input) differential 70 is in the torque flow, as shown in FIG. 5, where arrow 96 is to the wheels, arrow 98 is to the transmission and arrow 100 is to the motor-generator, for example. Typical operating modes, as shown in FIG. 8, may include generating mode 110 (charging the battery with power from the ICE), motoring mode 112 (powering the wheels from both the ICE and the motor-generator), regenerative braking mode 114 (charging the battery with power from the wheels), and/or electric only 116 (powering the wheels exclusively with the motor-generator).

According to an embodiment of this invention, suitable rear-wheel drive vehicles for hybridization may include heavy duty dual axle trucks 74, as shown in FIG. 7, for example. Heavy duty multiple-driven axle trucks 74 may be hybridized with the addition of an electric motor 32 before, between and/or after the rear axles 22. Desirably and as shown in FIG. 9, the electric motor 32 provides additional torque to the vehicle drive-train when instructed and/or commanded by the controller 42, for example.

According to another embodiment of this invention, an all-wheel drive vehicle 78, as shown in FIG. 10, and/or a four-wheel drive vehicle 74, as shown in FIG. 10, may be hybridized. FIG. 10 shows a known configuration with a transfer case 68 distributing propulsion power to the front wheels by a front differential 20'. Four-wheel drive vehicles 74 may provide more flexibility for installing the HEV kit 30.

Desirably, installing the HEV kit 30 in the four-wheel drive vehicle 72, as shown in FIG. 11, includes: 1) cutting and/or replacing the driveshaft 16 from the transfer case 68 to the front wheel differential 20; and 2) installing the electric machine 32 on the forward driveshaft 16 to provide propulsion torque during vehicle operation, so the vehicle 11 remains an four-wheel drive vehicle 72 with added power availability, for example. Alternately, FIG. 12 shows installing the electric machine 32 on the rearward driveshaft 22 of an all-wheel drive vehicle 78, according to one embodiment of this invention.

Figure 15:
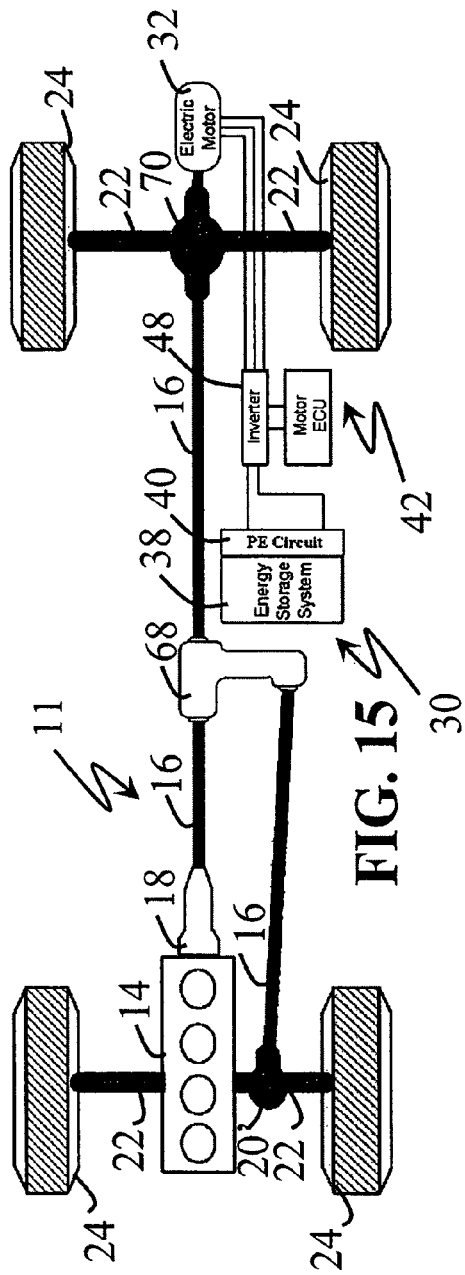
FIG. 15 shows an all-wheel drive vehicle with a HEV conversion kit installed (dual input differential configuration), according to one embodiment of this invention.

According to another embodiment of this invention, installing the HEV kit 30 onto a vehicle includes eliminating the transfer case and having two propulsion systems coupled through their mutual contact with the road and/or surface, such as, for example, providing separate power sources to front wheels and rear wheels while off-road driving over larger rocks. As shown in FIG. 13, the ICE 14 propels the vehicle 11 via the rear differential 20, while the electric motor 32 provides propulsion force to the front differential 20', for example. Alternately, a second transfer case 68 may be used to couple the drivetrain torque as shown in FIG. 14, for example. According to another embodiment of this invention, the dual input differential 70 hybridizes the vehicle, as shown in FIG. 15, for example.

Transfer cases 68 and/or differentials 70 (dual input differentials) desirably include robust technologies as an economic solution for hybridizing vehicles with an aftermarket hybrid electric conversion kits ("HECK") 30. According to an embodiment of this invention, the hybridization methodology is not limited to particular types of vehicles, rather it broadly includes any suitable vehicle, for example, a rear wheel driven passenger bus with a gasoline and/or diesel engine in the rear may be hybridized similar to what is illustrated in FIG. 6, but operating in the opposite direction (reversed).

The HEV kit retrofit approach of this invention according to one embodiment includes installing the electric drivetrain after and/or downstream of the transmission 18, as shown in FIG. 2. Desirably, the ICE 14 and the transmission 18 remain unaltered to facilitate and/or simplify installation of the HECK 30. The electric drivetrain may act as an electric turbo booster to improve performance and/or fuel economy. An intelligent control system may desirably provide both a balance of added performance and improved fuel economy.

According to an embodiment of this invention, the HECK 30 is applicable to automatic transmissions 60, as shown in FIG. 3, and/or manual transmissions 62 with a transmission clutch 64, as shown in FIG. 6. Desirably, the HECK 30 includes clutch pedal and/or linkage position information through the form of an analog and/or digital signal from a sensor 66, for example.

According to an embodiment of this invention, the HECK 30 includes a suitable control strategy algorithm and/or control scheme 50, as shown in FIG. 16. Typically, control strategies 50 for a HEV 11 interact with the ECU 55 of the ICE 14 and with the ECU 57 of the electric machine 32, maintaining two-way communication between each ECU. As shown in FIG. 16, communication lines 52 bridge and/or connect the ICE ECU 55 and the Motor ECU 57 through the control strategy 50 (broadly represented by controller 42 in FIGS. 2-3), for example. According to one embodiment of this invention, the HEV control strategy 50 observes both the ICE 14 and electric motor 32, so the control strategy 50 takes appropriate action in the form of commanding throttle angles for the engine 14 and/or torque commands for the electric motor 32 (two-way communication) by both the line to the engine ECU 54 and the line to the motor-generator ECU 57. According to another embodiment of this invention, the HEV control strategy 50 observes both the ICE 14 and the electric motor 32, but the control strategy 50 takes appropriate action only in the form of torque commands for the electric motor 32, by using a one-way communication with the ICE ECU 55 by the line to the motor-generator ECU 57. For example, observing the engine performance (engine rpm's, shaft rpm's, vehicle speed, transmission gear, and the like) with no commands given to the ICE ECU 55 from the controller. Put another way, the ICE 14 does not "know" that a HEV control strategy 50 or the HECK 30 is present.

Desirably, the HEV control strategy 50 serves to only give commands to the electric motor 32 which may simplify HECK 30 installation. According to an embodiment of this invention ICE 14 operation and/or performance is observed and appropriate torque commands may be given to the electric motor 32 resulting in improved overall vehicle performance 11 and/or fuel economy, such as, to run the motor-generator 32 when the gas pedal is depressed. Other communication wiring and signals are possible, such as, for example, sending and receiving signals from and/or to the engine and the controller.

Desirably, the HECK 30 of this invention can be installed in a few hours resulting in a hybridized vehicle 11 with minimal effect on the original ICE 14, the drivetrain and/or the ECU 55 of the ICE 14, as shown in FIG. 2. Desirably, the add-on kit 30 may be disabled with a command from the HEV control strategy and/or the driver, such as, under a fault condition, so the vehicle can be safely driven in conventional ICE mode.

According to an embodiment of this invention and as shown in FIG. 2, the parallel hybrid electric vehicle retrofit kit 30 for a vehicle with an internal combustion engine 14 connected to a driveshaft 16 by a transmission 18 includes a motor-generator 32, a torque coupler 34 adapted for connecting the motor-generator 32 to the driveshaft 16, a battery 38, a power electronics module 40 having a first electrical connector adapted to electrically connect to the battery 38 and a second electrical connector adapted to electrically connect to the motor-generator 32, a controller 42 having a first communication connection adapted to receive signals from the internal combustion engine 14, a second communication connection adapted to connect to the motor-generator 32, a decision circuit adapted to activate the motor-generator 32 to transfer electrical energy to or from the battery 38 into mechanical energy to or from the driveshaft 16.

The hybridized vehicle may include any suitable transportation device, such as, having wheels, treads, tracks, rails propellers, impellers, and/or any other suitable motive apparatus. According to an embodiment of this invention, the hybridized vehicles may include rear wheel drive vehicles, four-wheel drive vehicles, heavy duty multiple-driven axle vehicles and/or all-wheel drive vehicles. All-wheel drive vehicles and/or four-wheel drive vehicles may include part time and full time systems, for example, manually controlled by the driver and/or automatically controlled by a computer.

A retrofit kit of this invention may include the necessary parts, components and/or equipment needed to convert a conventional vehicle into a HEV. Various components may be used for some vehicles and configurations while other components may be used for different vehicles and/or configurations. Desirably, the retrofit kit offers a single purchase for a consumer to upgrade to a HEV. According to one embodiment of this invention, an assembled retrofit kit in combination with the vehicle operates in generating mode, motoring mode, braking mode and/or electric only mode.

As shown in FIG. 2, driveshaft 16 broadly may include the mechanical coupling between the transmission 18 and the differential 20, for example. Those skilled in the art and guided by the teaching herein will appreciate that a driveshaft 16 may include any suitable mechanical energy transmitting device, such as, using toque and/or rotational movement.

Transmissions 18 broadly may include the power transmitting coupling in combination with the ICE 14, such as, including one or more speed changing gears. According to one embodiment the transmission 18 includes automatic transmissions 60, as shown in FIG. 3, and/or manual transmissions 62, as shown in FIG. 6. Manual transmissions 62 typically, but not necessarily, may include a transmission clutch mechanism 64.

As seen in FIG. 2, differentials 20 broadly may include power transmitting devices, such as, connecting collinear shafts or axles 22 and allowing one to rotate independent of the other, for example. Other locking and/or partially locking combinations are possible.

The torque coupler 34 may include any suitable device and/or apparatus for adding, summing, combining, splitting, dividing and/or subtracting one or more motive and/or rotational forces. According to one embodiment of this invention, the torque coupler 34 includes at least one clutch 36, such as, to disconnect and/or decouple HEV functionality. According to one embodiment the torque coupler 34 comprises a transfer case 68 and/or a rear-through differential 70, as seen in FIGS. 3 and 6.

As shown in FIG. 2, the battery 38 may include any suitable device and/or apparatus for storing, containing, collecting and or distributing electrical power and/or potential, such as, for example, capacitors, ultra-capacitors, lead acid cells, lithium metal ion cells, metal hydride packs and/or any other design buffering and/or storing electrical energy.

As shown in FIG. 3, the power electronics module 40 may include any suitable circuitry for electrically connecting the battery 38 with the motor-generator 32, such as, an inverter 48, a rectifier 44, a capacitor and/or any other power transforming component. According to one embodiment of this invention, the power electronics module 40 also provides plug in hybrid electric functionality by including a plug 46 for connecting to an alternating current (AC) power source 58, for example.

As shown in FIG. 2, the controller 42 may include any suitable circuit, processor, computer, logic device, and/or comparator for executing and/or calculating at least a portion of the HEV control strategy or scheme, such as, in a digital and/or an analog mode. According to an embodiment of this invention and as shown in FIG. 6, the controller 42 includes a clutch sensor 66 detecting a position of the transmission clutch 64. According to another embodiment of this invention, the controller 42 exclusively sends signals to the motor-generator 32. Alternately, the controller 42 does not send signals to the internal combustion engine 14.

As shown in FIG. 2 and according to an embodiment of this invention, torque coupler 34 connects with a first portion of a driveshaft 16 to the transmission 18 and with a second portion of the driveshaft 16 to an axle 22. Axles 22 broadly include, without limitation, a pin, a spindle and/or a shaft on and/or with a wheel and/or a pair of wheels that may revolve, spin and/or rotate, for example.

As shown in FIG. 6 and alternately, the torque coupler 34 comprises a rear-through differential 70 connected to the driveshaft 16 from the transmission 18 opposite a connection to the motor-generator 32, for example.

This invention also includes a method of retrofitting a vehicle to a parallel hybrid electric vehicle. According to one embodiment of this invention, the method includes the steps of: providing a vehicle with an internal combustion engine, a transmission and a driveshaft; connecting a torque coupler to the driveshaft after and/or downstream from the transmission; connecting a motor-generator to the torque coupler; connecting and/or wiring a battery to the motor-generator using a power electronics module; connecting and/or wiring an input signal from the internal combustion engine and the motor-generator to a controller; and/or connecting and/or wiring an output signal from the controller to the motor-generator.

According to another embodiment of this invention, controller defines and/or provides hybrid electric modes including a generating mode, a motoring mode, a braking mode and an electric only mode. Suitable additional method steps may include: powering the vehicle with the internal combustion engine; powering the vehicle with the motor-generator and the battery; charging the battery with the internal combustion engine and the motor-generator, and charging the battery while slowing the vehicle with the motor-generator and the axle. Desirably, the installing the torque coupler includes replacing and/or modifying a differential with a rear-through differential.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible based at least in part on the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method of retrofitting a vehicle to a parallel hybrid electric vehicle, the method comprising:
    providing a vehicle with an internal combustion engine, a transmission and a driveshaft;
    connecting a dual input differential to the driveshaft downstream from the transmission;
    connecting a motor-generator to the dual input differential;
    connecting a battery to the motor-generator using a power electronics module;
    connecting an input signal from the internal combustion engine and the motor-generator to a controller; and
    connecting an output signal from the controller to the motor-generator.

2. The method of claim 1 wherein the controller defines hybrid electric modes comprising a generating mode, a motoring mode, a braking mode and an electric only mode.

3. The method of claim 1 further comprising:
    powering the vehicle with the internal combustion engine;
    powering the vehicle with the motor-generator and the battery;
    charging the battery with the internal combustion engine and the motor-generator; and
    charging the battery while slowing the vehicle with the motor-generator.

4. The method of claim 1 wherein connecting the dual input differential comprises replacing a differential with a rear-through differential.

5. The method of claim 1 wherein the method does not modify a control system of the internal combustion engine.

6. The method of claim 1 further comprising:
    providing a parallel hybrid electric vehicle retrofit kit for the vehicle, the retrofit kit including the motor-generator, a dual input modification subassembly comprising a differential pinion and a differential pinion shaft assembly, wherein the dual input modification subassembly creates a second differential input adapted for connecting the motor-generator to the driveshaft, the battery, a power electronics module having a first electrical connector adapted to electrically connect to the battery and a second electrical connector adapted to electrically connect to the motor-generator, and the controller.

7. The method of claim 6, wherein the controller includes a first communication connection for receiving signals from the internal combustion engine and a second communication connection for connecting to the motor-generator, the controller further including a decision circuit adapted to activate the motor-generator to transfer electrical energy to or from the battery into mechanical energy to or from the driveshaft.

8. The method of claim 1 wherein the vehicle is selected from the group consisting of rear wheel drive vehicles, four-wheel drive vehicles, heavy duty multiple-driven-axle vehicles and all-wheel drive vehicles.

9. The method of claim 1 further comprising electrically connecting a plug for connection to an alternating current power supply to the battery through a rectifier electrically connected to the plug and the battery.

10. The method of claim 1 wherein the controller exclusively sends signals to the motor-generator.

11. The method of claim 1 wherein the controller does not send signals to the internal combustion engine.

12. The method of claim 1 wherein the dual input differential comprises a rear-through differential.

13. The method of claim 1 wherein connecting the dual input differential comprises modifying a differential having a first pinion and a first pinion shaft having a first input from the internal combustion engine to also include a second pinion and a second pinion shaft having a second input from the motor-generator.

14. A method of retrofitting a vehicle to a parallel hybrid electric vehicle, the method comprising:
    providing a vehicle with an internal combustion engine, a transmission, a driveshaft and a differential connected to the driveshaft downstream from the transmission;
    modifying the differential to a dual input differential having a first input from the internal combustion engine and a second input from a motor-generator;
    connecting the motor-generator to the modified differential;
    connecting a battery to the motor-generator using a power electronics module;
    connecting an input signal from the internal combustion engine and the motor-generator to a controller; and
    connecting an output signal from the controller to the motor-generator.

15. The method of claim 14 wherein the controller defines hybrid electric modes comprising a generating mode, a motoring mode, a braking mode and an electric only mode.

16. The method of claim 14 further comprising:
    powering the vehicle with the internal combustion engine;
    powering the vehicle with the motor-generator and the battery;
    charging the battery with the internal combustion engine and the motor-generator; and
    charging the battery while slowing the vehicle with the motor-generator.

17. The method of claim 14 wherein the vehicle is selected from the group consisting of rear wheel drive vehicles, four-wheel drive vehicles, heavy duty multiple-driven-axle vehicles and all-wheel drive vehicles.

18. The method of claim 14 further comprising electrically connecting a plug for connection to an alternating current power supply to the battery through a rectifier electrically connected to the plug and the battery.

19. The method of claim 14 wherein the controller exclusively sends signals to the motor-generator.

20. The method of claim 14 wherein the controller does not send signals to the internal combustion engine.

* * * * *